United States Patent
Choi (10) Patent No.: US 10,456,651 B2
(45) Date of Patent: Oct. 29, 2019

(54) GOLF SIMULATOR, AND GOLF SIMULATION METHOD

(71) Applicant: RD-Tek CO., LTD, Daejeon (KR)

(72) Inventor: Song Hwan Choi, Daejeon (KR)

(73) Assignee: RD-TEK CO., LTD, Daejeon (KR)

( * ) Notice: Subject to any disclaimer, the term of this patent is extended or adjusted under 35 U.S.C. 154(b) by 224 days.

(21) Appl. No.: 15/039,177

(22) PCT Filed: Nov. 20, 2014

(86) PCT No.: PCT/KR2014/011182
§ 371 (c)(1),
(2) Date: May 25, 2016

(87) PCT Pub. No.: WO2015/080431
PCT Pub. Date: Jun. 4, 2015

(65) Prior Publication Data
US 2017/0209764 A1    Jul. 27, 2017

(30) Foreign Application Priority Data
Nov. 28, 2013 (KR) .................. 10-2013-0146055

(51) Int. Cl.
*A63B 69/36* (2006.01)
*G09B 19/00* (2006.01)
(Continued)

(52) U.S. Cl.
CPC ...... *A63B 69/3658* (2013.01); *A63B 24/0021* (2013.01); *G06K 9/00342* (2013.01);
(Continued)

(58) Field of Classification Search
CPC .................. A63B 69/3658; A63B 24/0021
(Continued)

(56) References Cited

U.S. PATENT DOCUMENTS 4,160,942 A * 7/1979 Lynch ............... A63B 24/0021
359/443
5,226,660 A * 7/1993 Curchod ............ A63B 24/0021
473/155
(Continued)

FOREIGN PATENT DOCUMENTS

CN          1677112       10/2005
CN        101890218       11/2010
(Continued)

OTHER PUBLICATIONS

International Search Report—PCT/KR2014/011182 dated Mar. 11, 2015.

*Primary Examiner* — Chase E Leichliter
(74) *Attorney, Agent, or Firm* — Cantor Colburn LLP (57) ABSTRACT

A golf simulator comprises a photosensor unit, an image input unit, a movement information calculation unit, a spin information calculation unit and a flight trajectory calculation unit. The photosensor unit detects a moving path of a golf ball by using a plurality of photosensors, the image input unit inputs movement images of the golf ball, the movement information calculation unit calculates a moving direction and speed of the golf ball from information acquired from the photosensor unit, the spin information calculation unit calculates a spin amount of the golf ball from the inputted images, and the flight trajectory calculation unit calculates a flight trajectory of the golf ball by using movement information and spin information. The speed and direction of a golf ball, and a spin of the golf ball are accurately measured by using a separate image input device to calculate a spin amount of the golf ball.

10 Claims, 7 Drawing Sheets

(51) Int. Cl.
*A63B 24/00* (2006.01)
*G06K 9/00* (2006.01)

(52) U.S. Cl.
CPC .. *G09B 19/0038* (2013.01); *A63B 2024/0034* (2013.01); *A63B 2220/803* (2013.01); *A63B 2220/805* (2013.01); *A63B 2220/806* (2013.01)

(58) Field of Classification Search
USPC .................. 473/131, 140, 141, 151, 156
See application file for complete search history.

(56) References Cited

U.S. PATENT DOCUMENTS

| | | | | |
|---|---|---|---|---|
| 5,303,924 | A * | 4/1994 | Kluttz | A63B 24/0021 473/155 |
| 5,354,063 | A * | 10/1994 | Curchod | A63B 24/0021 473/155 |
| 2004/0032970 | A1 * | 2/2004 | Kiraly | A63B 24/0021 382/103 |
| 2004/0198524 | A1 * | 10/2004 | Kwon | A63B 24/0021 473/151 |
| 2006/0008116 | A1 * | 1/2006 | Kiraly | G06T 7/20 382/103 |
| 2008/0153613 | A1 * | 6/2008 | Choi | A63B 24/0021 473/156 |
| 2008/0201100 | A1 * | 8/2008 | Petrov | G01S 5/16 702/149 |
| 2009/0036237 | A1 * | 2/2009 | Nipper | A63B 24/0021 473/409 |
| 2009/0042627 | A1 * | 2/2009 | Nicora | A63B 24/0003 463/2 |
| 2010/0151956 | A1 * | 6/2010 | Swartz | A63B 24/0006 473/199 |
| 2011/0070961 | A1 * | 3/2011 | Nicora | A63B 69/3658 473/156 |
| 2011/0250939 | A1 * | 10/2011 | Hobler | A63B 57/00 463/7 |

FOREIGN PATENT DOCUMENTS

| | | |
|---|---|---|
| KR | 1020090077170 | 7/2009 |
| KR | 100977335 | 8/2010 |
| KR | 101019902 | 3/2011 |
| KR | 101078975 | 11/2011 |
| KR | 1020130001534 | 1/2013 |
| KR | 1020130046475 | 5/2013 |

* cited by examiner

GOLF SIMULATOR, AND GOLF SIMULATION METHOD

TECHNICAL FIELD

The present invention relates to a system and method for simulation, and more particularly, to a golf simulating system and a golf simulation method for simulating a golf game.

BACKGROUND ART

As golf becomes popular, simulation golf (i.e. screen golf) becomes explosively popular. Simulation golf rapidly increases users by providing golfers with easier accessibility to a golf game, but there are golfers having negative opinions because a golf simulator does not provide the perfectly same result as an actual game.

Currently, a sensor system of a golf simulator senses a golf ball, which is hit by a golfer, with an optical sensor disposed on the bottom, measures a velocity, a direction, and a launch angle of the golf ball, and based on this, estimates a flying trajectory of the golf ball. At this point, since it is not structurally possible to directly measure a ball spin, a result thereof is mainly estimated using a statistical approach.

However, since a golf ball spin is indirectly measured through calculation or a statistical approach by observing correlations between a club and a ball velocity and direction or the like, there occurs a large error in spin measurement

DISCLOSURE

Technical Problem

The present invention provides a golf simulator and a golf simulation method which measure a velocity and a direction of a golf ball using an optical sensor, measure a golf ball spin using an image sensor, and combine the measured results, through relative comparison of sensing accuracies, to provide a flying trajectory of a golf ball, which is more proximate to reality.

Technical Solution

In accordance with an exemplary embodiment, a golf simulator includes: an optical sensor unit, an image inputting unit, a movement information calculating unit, a spin information calculating unit, and a flying trajectory calculating unit.

The optical sensor unit detects a movement path of a golf ball using a plurality of optical sensors, the image inputting unit inputs a movement image of the golf ball, the movement information calculating unit calculates a direction and velocity of the golf ball from information obtained from the optical sensor unit, the spin information calculating unit calculates a spin rate of the golf ball from the input image, and the flying trajectory calculating unit calculates a flying trajectory of the golf ball using the movement information and the spin information.

According to such a configuration, the spin rate of the golf ball is calculated using a separate image input device and accordingly, the spin of the golf ball as well as the velocity and direction thereof may be accurately measured to allow the flying trajectory of the golf ball, which is more proximate to reality, to be simulated.

In addition, the golf simulator may further include an image input start signal generating unit for generating an image input start signal for allowing the image inputting unit to start to input an image, when a detection result of the optical sensor unit corresponds to a preset image input start reference, and the preset image input start reference at this point may be that the golf ball starts to move. According to such a configuration, since only images required to calculate the spin rate are input, unnecessary resources and efforts for image analysis can be reduced.

In addition, the golf simulator may further include an image input start reference setting unit for setting the preset image input start reference. Such a configuration allows the image input start reference to be set according to a situation, an optimal setting may become re-set according to an installation or operation environment of the simulator.

In addition, the optical sensor unit further detects a movement path of a golf club hitting the golf ball, and a spin rate comparison unit is further comprised which compares a spin rate of the golf ball calculated by the spin information calculating unit and a spin rate calculated using the movement path of the golf club. According to such a configuration, a serious error may be excluded which occurs in the spin rate of a golf ball, which is calculated from input images.

Furthermore, a golf simulation method is disclosed in which the golf simulator is implemented in a method type.

Advantageous Effects

According to the present invention, a relatively more accurate spin rate of a golf ball is calculated using a separate image compared with using an output of an optical sensor, and the calculated spin rate is combined with data measured by the optical sensor to accurately calculate a golf ball spin as well as a velocity and direction of the golf ball, thereby capable of simulating a flying trajectory of the golf ball, which is more proximate to reality.

In addition, since only images required to calculate the spin rate are input, unnecessary resources and efforts for image analysis can be reduced.

In addition, an optimal operation environment can be set according to an installation or operation environment of the simulator.

In addition, a serious error can be excluded which occurs in the spin rate of a golf ball, which is calculated from input images.

MODE FOR INVENTION

Hereinafter, it will be described in detail about an exemplary embodiment of the present invention in conjunction with the accompanying drawings.

Figure 1:
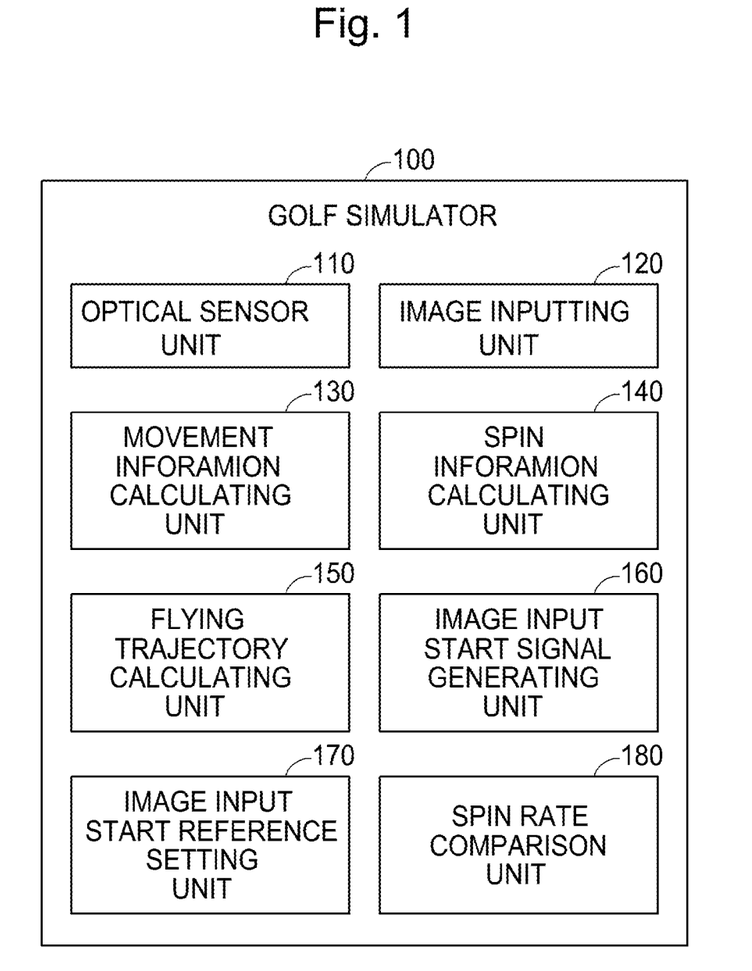
FIG. 1 is a schematic block diagram of a golf simulator according to an embodiment of the present invention.

FIG. 1 is a schematic block diagram of a golf simulator according to an embodiment of the present invention.

In FIG. 1, a golf simulator 100 includes an optical sensor unit 110, an image inputting unit 120, a movement information calculating unit 130, a spin information calculating unit 140, a flying trajectory calculating unit 150, an image input start signal generating unit 160, an image input start reference setting unit 170, and a spin rate comparison unit 180.

In FIG. 1, each element of the golf simulator 100 may be implemented only in hardware, but they may be also implemented in software operating with the hardware.

The optical sensor unit 110 detects a movement path of a golf ball using a plurality of optical sensors. At this point, the optical sensor unit 110 may further detect a movement path of a golf club, which hits the golf ball, in addition to the movement path of the golf ball.

Figure 2:
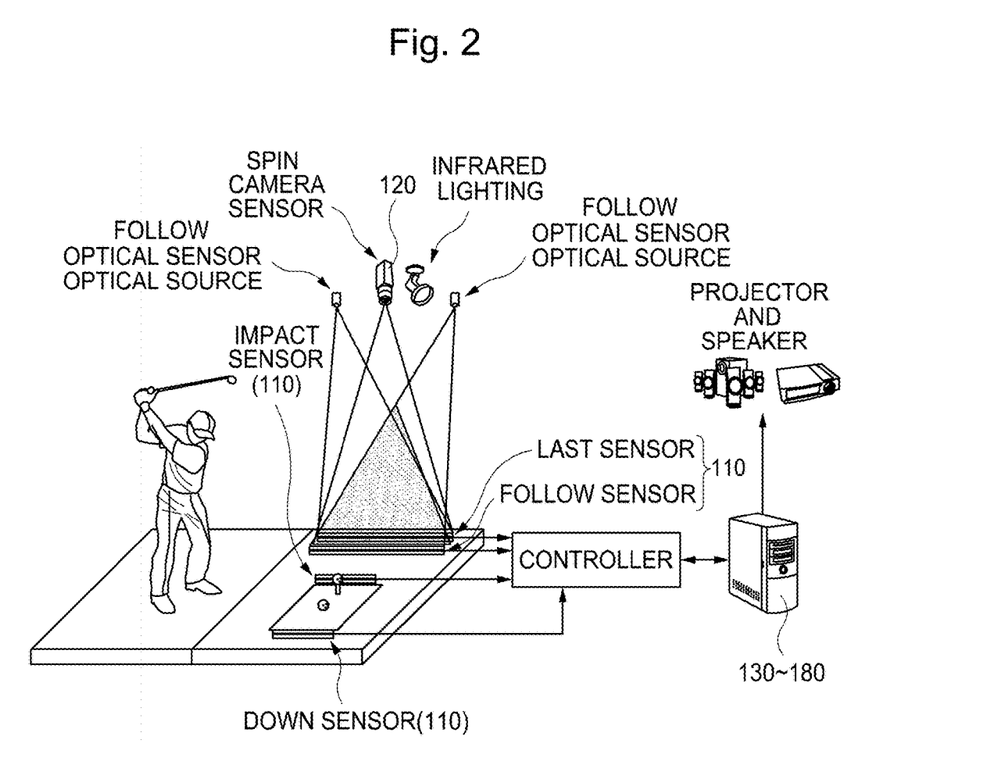
FIG. 2 illustrates a usage state of a configuration of the golf simulator of FIG. 1.
Figure 3:
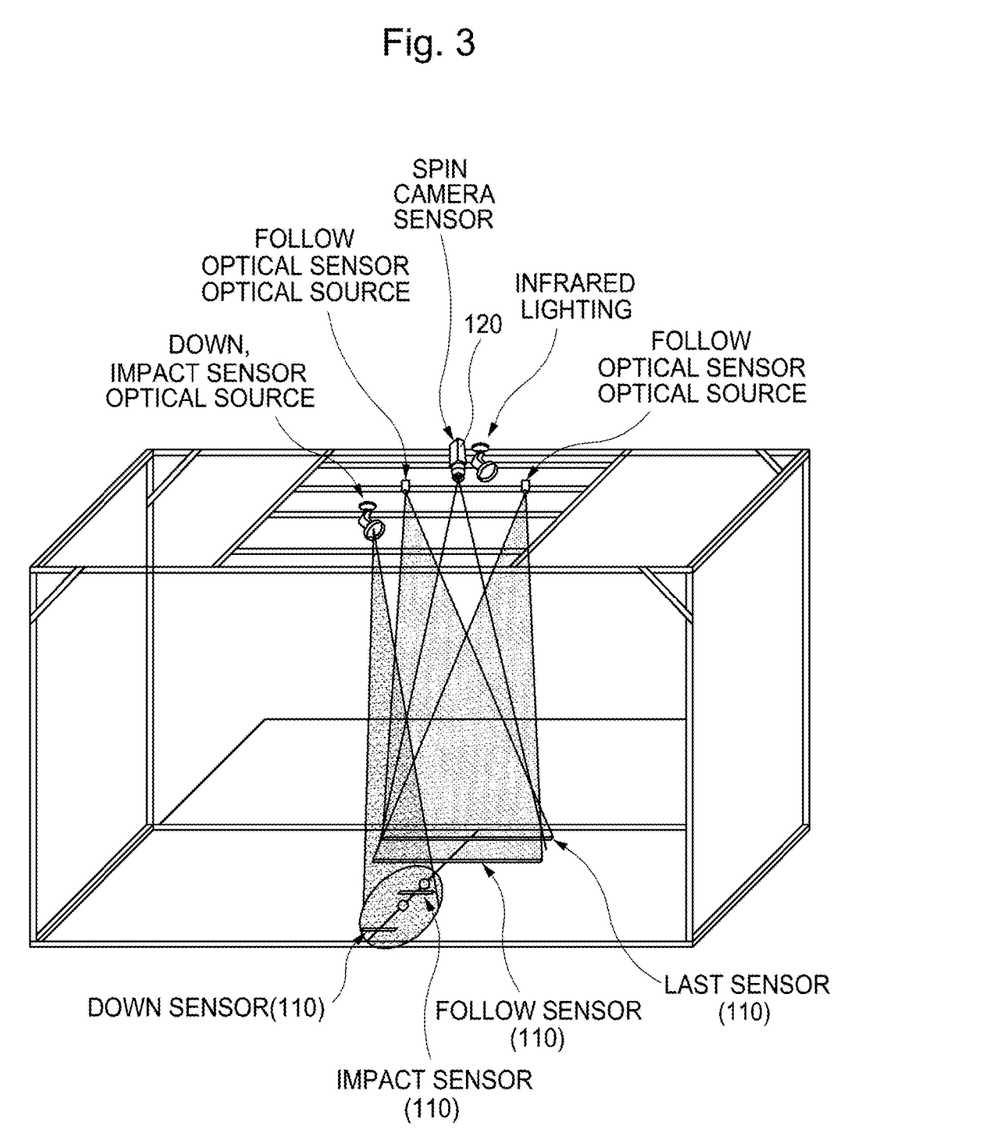
FIG. 3 is an aerial view of a booth in which the golf simulator of FIG. 1 is installed.

FIG. 2 illustrates a usage state of a configuration of the golf simulator of FIG. 1, and FIG. 3 is an aerial view of a booth in which the golf simulator of FIG. 1 is installed.

In FIGS. 2 and 3, structures of a sensor measuring system of the golf simulator are illustrated. FIG. 2 represents configurations and names of the optical sensors and the camera sensors, and FIG. 3 represents configurations of sensors and optical sources included in the installed booth.

As shown in FIGS. 2 and 3, the configurations of the sensors include a down sensor, an impact sensor, a follow sensor, and a last sensor disposed on the bottom.

The down sensor and impact sensor disposed on the bottom are infrared ray sensors and are set to operate by a halogen optical source installed on the ceiling or the top portion of the booth. The follow sensor and last sensor are respectively set to operate by laser projectors installed to face each other on the ceiling or the top portion of the booth.

Accordingly, the optical sensors 110 of the golf simulator form total four light screens. In this way, in a state where the light screens are formed by the optical sensors and optical sources, a shadow generated when a golfer hits a golf ball and the club and golf ball pass through the light screens is sampled and measured in a high speed.

The image inputting unit 120 inputs a movement image of the golf ball.

A sensor system of a typical golf simulator includes optical sensors disposed only on the bottom without the spin camera sensors 120 on the top portions in FIGS. 2 and 3, and senses a golf ball hit by the golfer to measure a velocity, direction (i.e. space vector), and spin of the golf ball. However, with such a configuration, a space vector (direction, velocity) of the flying golf ball may be accurately extracted, but there is a structural limit in measuring the spin in such a measurement manner.

Accordingly, in order to measure a spin, a spin of the golf ball has been calculated through indirect calculation or a statistical approach by observing a correlation between the club and velocity and direction of the ball. In such a manner, there occurs a large error in spin measurement.

In order to address such a limit, as illustrated in FIGS. 2 and 3, the present invention proposes a method for directly measuring a spin factor of a golf ball by obtaining an image of a flying golf ball through the spin camera 120 disposed on the top portion.

The movement information calculating unit 130 calculates a velocity and direction of the golf ball from information obtained from the optical sensor unit 110.

Figure 4:
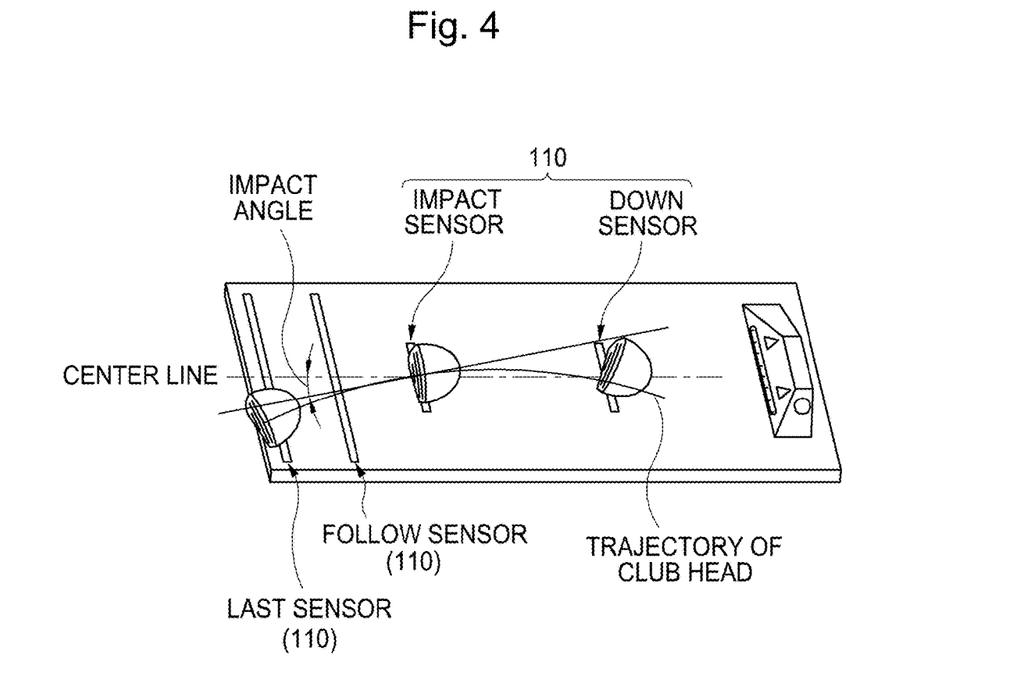
FIG. 4 illustrates a principle of measuring a flat trajectory of a golf club.

FIG. 4 illustrates a principle of measuring a flat trajectory of a golf club. FIG. 4 illustrates a principle of measuring a club trajectory and a principle of obtaining, from the trajectory, a tangential vector and an impact angle at the golf ball.

As illustrated in FIG. 4, bottom sensors 110 including the down, impact, follow, and last sensors, and optical sources facing the sensors are disposed at fixed positions in a space. Accordingly, since spatial positions thereof are known, planes in space respectively made by the sensors are calculated.

From these, when the club passes each sensor plane, position coordinates of the club measured from each sensor may be measured. By using three or four points measured in this way, a club movement trajectory is derived through the least square interpolation method, the position coordinates of the fixed golf ball, which are already known, are substituted to the derived club movement trajectory to derive an equation of tangent at a point at which the golf ball is positioned.

From this equation of tangent, an impact angle at the time when the club hits the golf ball may be calculated. A club velocity is obtained using a movement distance and a movement time when the club passes through each sensor.

Figure 5:
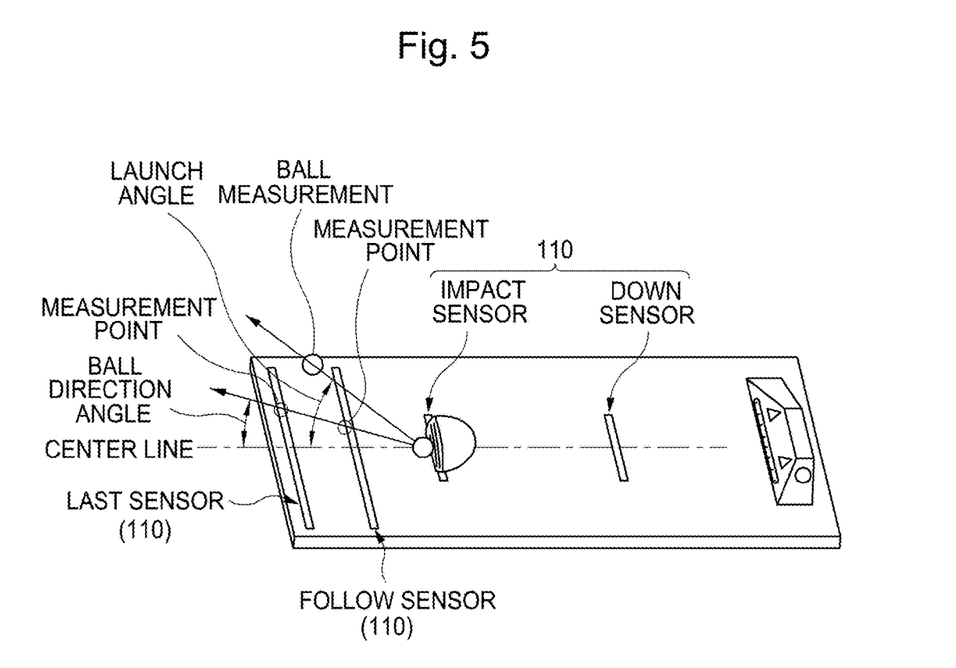
FIG. 5 illustrates a principle of measuring a launch angle and space velocity of a golf ball.

FIG. 5 illustrates a principle of measuring a launch angle and space velocity of a golf ball. FIG. 5 illustrates a principle of obtaining a spatial velocity vector of a flying golf ball when a golfer hits the golf ball.

As shown in FIG. 5, the follow sensor and the last sensor, and a follow sensor optical source and a last optical source respectively facing the follow sensor and the last sensor are fixed in space and their position coordinates are known. Accordingly, equations of planes may be obtained for the light screens which have been formed by respective optical sources and bottom sensors.

In addition, since the size of the golf ball is also known, when a center point of a shadow, which is generated when the golf ball passes through the light screen formed by each sensor, is measured, spatial coordinates of the golf ball passing through each sensor plane, may be obtained. When points on the spatial coordinates obtained in this way are connected, a flying vector of the golf ball in space may be obtained.

In addition, a velocity of the golf ball may be obtained through obtaining a spatial velocity thereof that is obtained by calculating a movement distance of the golf ball on spatial position coordinates, which are calculated on each sensor plane, and by using time differences when passing through respective points. The velocity vector of the golf ball obtained in this way includes all the launch angle, directional angle, and velocity of the golf ball.

The spin information calculating unit 140 calculates a spin rate of the golf ball from an input image.

Due to the recent progress of the computer and camera technology, since the price of camera becomes going down and performance becomes better, it is easy to attempt to apply an image analysis technique to an image obtained from a camera and extract information on the golf ball.

Although a camera sensor is highly advantageous in that the velocity or direction, and the spin of the golf ball may be obtained at the same time and the spin, which may not be obtained from other sensors, may be measured, accuracy of the image analysis becomes lowered and much errors may be included in the analysis result due to environmental factors such as indoor use. Furthermore, for the velocity and direction of the golf ball, accuracy and resolution are considerably degraded in comparison to an optical sensor.

Therefore, in the present invention, the velocity and direction (i.e. spatial vector) of the golf ball are calculated from an optical sensor system and a spin component of the golf ball is directly measured by obtaining an image of a flying golf ball through a spin camera disposed above.

The flying trajectory calculating unit 150 calculates the flying trajectory of the golf ball using the calculated movement information and spin information. According to such a configuration, the spin rate of the golf ball is calculated using a separate image input device and accordingly the spin of the golf ball as well as the velocity and direction thereof may be accurately measured to allow the flying trajectory of the golf ball, which is more proximate to reality, to be simulated.

When a detection result from the optical sensor unit 110 corresponds to a preset image input start reference, the image input start signal generating unit 160 generates an image input start signal for starting to input images.

At this point, the preset image input start reference may be that the golf ball starts to move. According to such a configuration, since only images required to calculate the spin rate are input, unnecessary resources and efforts for image analysis can be reduced.

The image input start reference setting unit 170 sets the preset image input start reference. Since such a configuration allows the image input start reference to be set according to a situation, an optimal setting may become re-set according to an installation or operation environment of the simulator.

The spin rate comparison unit 180 compares a spin rate of the golf ball calculated in the spin information calculating unit 140 and a spin rate calculated using a movement path of the golf club. According to such a configuration, a serious error can be excluded which occurs in the spin rate of the golf ball, which is calculated from input images.

Figure 6:
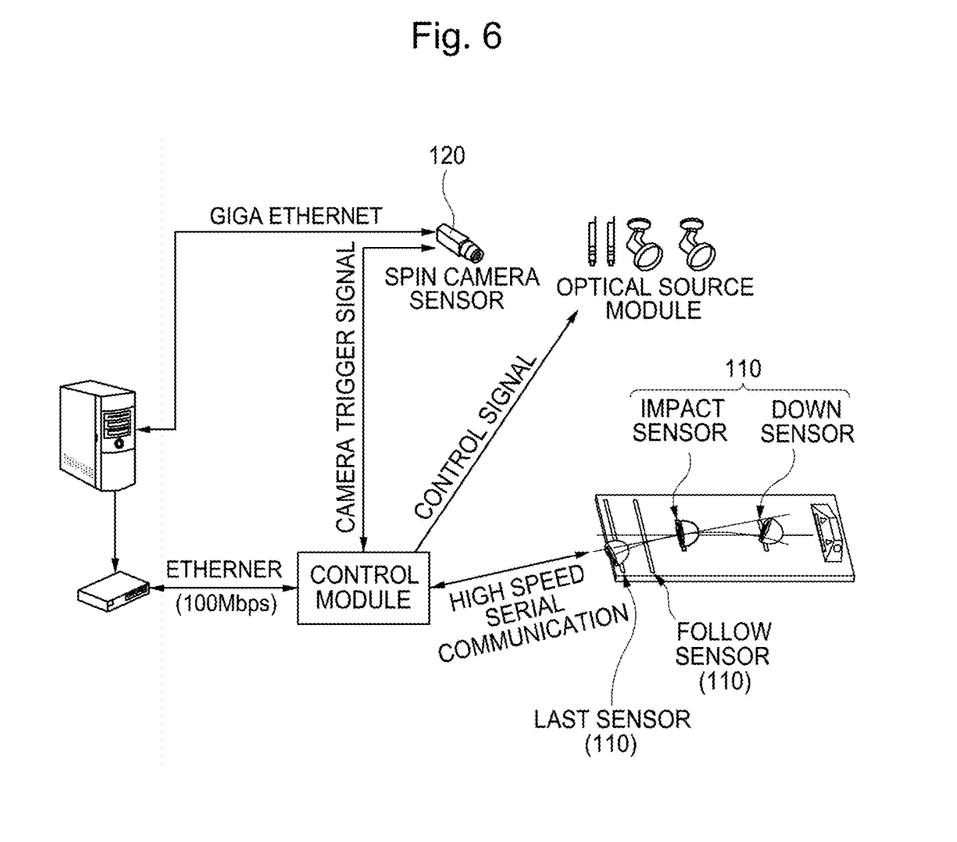
FIG. 6 is a conceptual view of interaction between a camera sensor and an optical sensor.

FIG. 6 is a conceptual view of interaction between a camera sensor and an optical sensor. In FIG. 6, interaction between the spin camera sensor and the optical sensor are schematized in a concept of signals. As illustrated in FIG. 6, when the golfer hits the golf ball, the club sequentially passes through light screens of the down, impact, follow, and last sensors. In addition, the golf ball sequentially passes through the impact, follow, and last sensors.

At this point, the control module may detect which object (e.g. the club or golf ball) passes through each light screen, and generate, with a detection signal, a trigger signal (i.e. an image capture signal) for the spin camera to allow the camera sensor to operate.

At this point, the trigger signal may be generated for the spin camera sensor by selecting a sensor corresponding to a time of generating the trigger signal in a software manner, when the object passes through each of the down, impact, follow, and last sensors. In this way, the golf ball may be sensed (i.e. an image is captured) within a range measured by the spin camera.

The image obtained from the camera as a result of such operations is analyzed and then the spin rate is derived. The spatial vector (the launch angle, the direction angle, and the velocity) obtained from the optical sensor and the spin rate (backspin, sidespin) obtained from the camera are combined to obtain the flying trajectory of the golf ball in a 3-dimensional virtual space.

Figure 7:
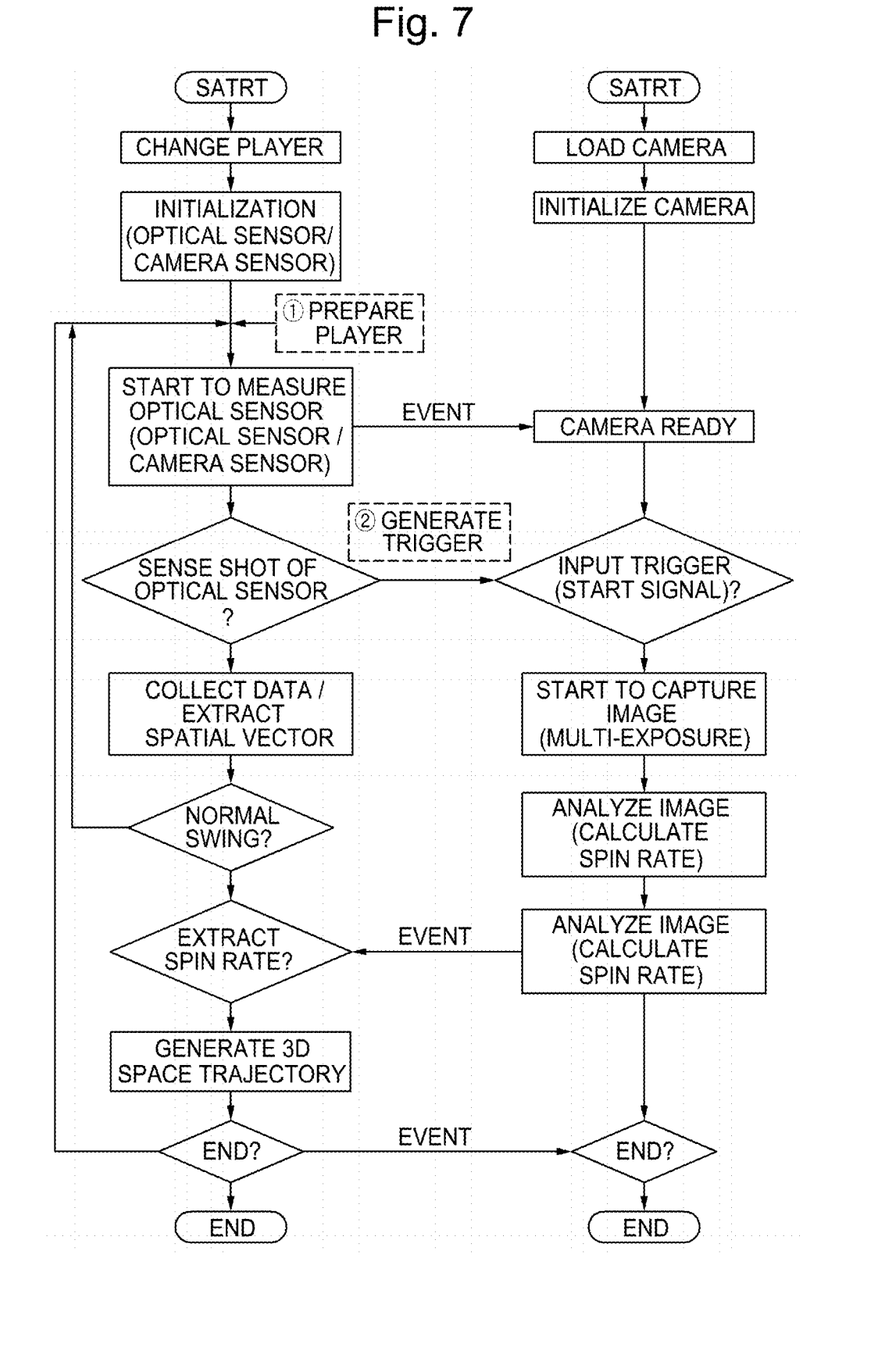
FIG. 7 is a schematic flowchart for performing a golf simulation method according to the present invention.

FIG. 7 is a schematic flowchart for performing a golf simulation method according to the present invention.

FIG. 7 illustrates a blocked interaction operation between the camera sensor and the optical sensor. In an order of displacements in a space and measurement, the optical sensor firstly starts to operate, the ball starts to move, and then the camera captures images. Therefore a manner in which an optical sensor stage controls events for the camera sensor is adopted, and the spin information is obtained from the camera sensor when the golf ball is normally measured by the optical sensor.

As seen from FIG. 7, in the present invention, data respectively measured by the optical sensors and image sensors may be combined to enable the flying trajectory of the golf ball, which is more proximate to reality, to be provided to users of the simulation golf.

To this end, when the optical sensors start to measure, an operation of the image sensor (i.e. a camera) is prepared. When a shot is sensed by the optical sensors, the image sensor starts to capture images. When a normal swing is recognized from the optical sensors, data detected from the optical sensors is combined to data detected from the image sensor to provide an output result to the golfer.

In this way, since operation controls for the sensors as well as combination of measured data are performed using different kinds of sensors, the golfer may be provided a golf environment, which is more proximate to reality, and a golf simulation system may more efficiently operate, abnormal operations of the sensors may be easily detected, and therefore the golf simulation system manager may considerably relieve a burden of management.

Although the present invention has been described in terms of preferred embodiments thereof, the scope of the present invention is not limited thereto. Various modifications or improvements of the embodiments are considered to be within the scope of the present invention as defined by the following claims.

What is claimed is:

1. A golf simulator comprising:
an optical sensor unit configured to detect a movement path of a golf ball using a plurality of optical sensors;
an image inputting unit configured to input a movement image of the golf ball using a spin camera sensor;
a movement information calculating unit configured to calculate a direction and velocity of the golf ball from information obtained from the optical sensor unit;
a spin information calculating unit configured to calculate a spin rate of the golf ball from the input movement image of the golf ball;
a flying trajectory calculating unit configured to calculate a flying trajectory of the golf ball using the calculated direction and velocity of the golf ball and the calculated spin rate of the golf ball; and
a spin rate comparison unit configured to compare the calculated spin rate and a spin rate calculated using data obtained by the optical sensors for excluding an error occurred in the spin rate calculated by the spin information calculating unit.

2. The golf simulator of claim 1, further comprising: an image input start signal generating unit configured to generate an image input start signal for allowing the image inputting unit to start to input the movement image of the golf ball, when a detection result of the optical sensor unit corresponds to a preset image input start reference.

3. The golf simulator of claim 2, wherein the preset image input start reference is that the golf ball starts to move.

4. The golf simulator of claim 2, further comprising: an image input start reference setting unit for setting the preset image input start reference.

5. The golf simulator of claim 1,
wherein the optical sensor unit is further configured to detect a movement path of a golf club hitting the golf ball, and wherein the spin rate comparison unit is configured to compare the calculated spin rate and a spin rate calculated using the movement path of the golf club.

6. A golf simulation method, which is performed by a golf simulator, the golf simulation method comprising:
- a golf ball movement path detecting step for detecting a movement path of a golf ball using a plurality of optical sensors;
- an image input step for inputting a movement image of the golf ball using a spin camera sensor;
- a movement information calculating step for calculating a direction and velocity of the golf ball from information obtained from the plurality of optical sensors;
- a spin information calculating step for calculating a spin rate of the golf ball from the input movement image of the golf ball;
- a flying trajectory calculating step for calculating a flying trajectory of the golf ball using the calculated direction and velocity of the golf ball and the calculated spin rate of the golf ball and
- a spin rate comparison step for comparing the calculated spin rate and a spin rate calculated using data obtained by the plurality of optical sensors for excluding an error occurred in the spin rate calculated by the spin information calculating step.

7. The golf simulation method of claim 6, further comprising an image input start signal generating step for generating an image input start signal to start to input the movement image of the golf ball, when detection results of the plurality of optical sensors correspond to a preset image input start reference.

8. The golf simulation method of claim 7, wherein the preset image input start reference is that the golf ball starts to move.

9. The golf simulation method of claim 7, further comprising an image input start reference setting step for setting the preset image input start reference.

10. The golf simulation method of claim 6,
wherein the plurality of optical sensors further detect a movement path of a golf club hitting the golf ball, and
wherein the spin rate comparison step compare the calculated spin rate of the golf ball and a spin rate calculated using the movement path of the golf club.

* * * * *